Figure 1:
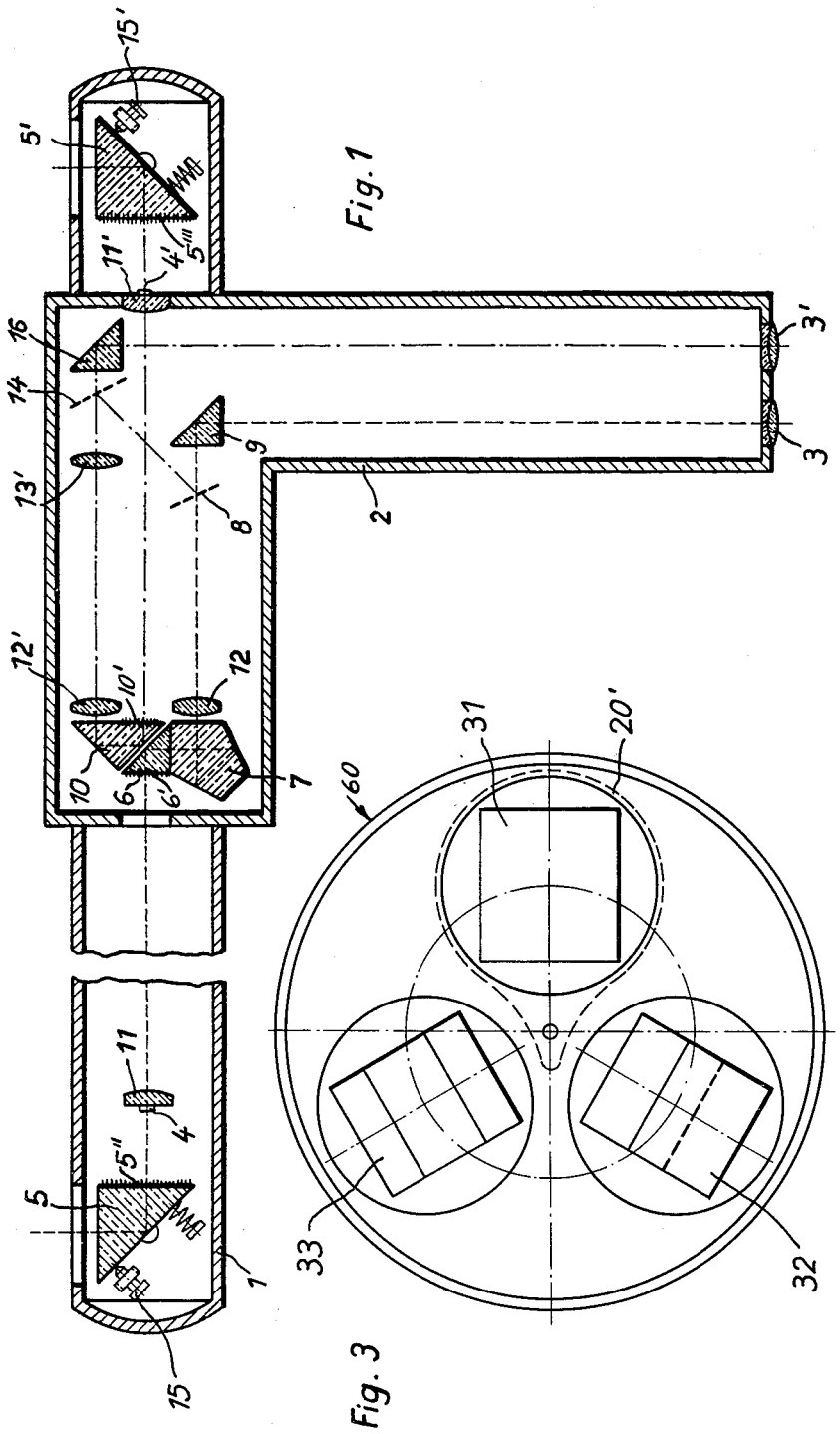

United States Patent Office 3,194,108
Patented July 13, 1965

3,194,108
OPTICAL RANGE FINDER WITH MARKER IMAGE MEANS AND MOVABLE REFLECTOR SYSTEM FOR COINCIDENCE OR STEREOSCOPIC TYPE RANGE FINDING
Norbert Günther, Aalen, Wurttemberg, Germany, assignor to Carl Zeiss, Oberkochen, Wurttemberg, Germany
Filed Apr. 27, 1960, Ser. No. 25,158
Claims priority, application Germany, Apr. 29, 1959,
Z 7,290
4 Claims. (Cl. 88—2.7)

The invention relates to improvements in range finders of that type in which within the subdivided viewing area the portions of a sighted territory marker or measuring marker are brought into superposition or into a position of mutual compensation in accordance with the so called coincidence principle.

In devices of this type it is necessary for the adjustment that in general the coincidence adjustment takes place upon a marker which is arranged in the territory and at a known distance from the range finder, or one must sight a luminous celestial body when the adjustment takes place for infinity. However, frequently the condition of the territory does not permit the placement of an adjusting marker at a known distance or the weather conditions are such that the sighting upon a luminous celestial body is impossible.

It is an object of the present invention to provide a range finder which is constructed in such a manner that the adjustment takes place in a simple manner by means of markers arranged on the device itself. In other words, the adjustment is made independent of the conditions of the territory or of the weather.

In accordance with the invention the range finder is constructed in such a manner that it may be used selectively as a coincidence range finder and as a stereoscopic range finder. For this purpose the range finder of the invention is provided with two telescope objectives which are arranged in a fixed distance away from each other and also are arranged symmetrically with respect to an imaginary axis extending in the direction of observation and each objective is provided with a marker. The separate paths of the light rays are deflected by known optical deflecting means into a common ocular tube. Furthermore, there is arranged in the path of the rays of the two telescope objectives a reflection system which for one of the paths of the rays is at least partly transmitting without changing the direction, while the reflecting surfaces arranged in the other path of the rays are inclined in such a manner that the two paths of the rays are combined with each other. The two measuring markers attached to the telescope objectives are arranged in such a manner that upon correct adjustment of the device these markers appear in the viewing area of the telescope objective in coincidence.

In accordance with this principle it is possible to provide range finders with coincidence adjustment according to the mixed image method or split image method or reverse image method with an interior adjustability, and by a simple manipulation it is possible to convert the same into a stereoscopic range finder. It is also possible to provide different exchangeable reflecting systems and to use the same selectively for performing different measuring methods with one and the same device.

In the simplest form the reflecting system may consist of two mirrors which are arranged in the two divided paths of the light rays; of these two mirrors one is completely reflective while the other is only partly reflective. The completely reflective mirror causes a reflection of one of the two partial light beams toward the partly reflecting mirror which is arranged with a suitable inclination in the path of the other partial light beam, the direction of reflection of which coincides with the direction of the path of the other light beam. However, one may also employ a reflecting system having the form of a prism system produced by cementing together a plurality of prisms to form a solid body which is not sensitive to any readjustment.

For instance, when constructing a reverse image range finder, the reflecting system according to the invention will take the form of an irregular penta prism which presents to the main beam of the partial light beams to be reflected a surface arranged at right angles to the direction of incidence while the inclined surface which is presented to the other light beam is provided with supplemental prisms for the creation of incident and exit surfaces which are positioned at right angles to the main beam.

In case of a mixed image or split image range finder the reflecting system will be constructed as a prism in the form of a pentagonal prism which presents to the main light beam of the beams of light to be deflected a prism surface arranged at right angles to the direction of incidence, the roof edge of which is, however, replaced by a simple reflecting surface while the other inclined reflecting surface presented to the other partial light beam again is provided with a supplemental prism for the creation of an incident surface arranged at right angles to the main beam.

It may also be desirable to arrange the reflecting system placed in the partial light beams of the telescope objectives in the form of a pivotally mounted reflecting system which may be tilted outwardly of the path of the rays and may be replaced by another reflecting system. For this purpose there is provided a carrier having mounted thereon a plurality of reflecting systems. This carrier may be constructed as a slidable carrier or as a rotatable carrier which may be rotatably adjusted about an eccentric axis. When this is done, there exists the possibility to convert a coincidence range finder into a stereoscopic range finder. This can be done without difficulties in view of the two telescope objectives which are arranged at a fixed distance from each other, because this distance may form the fixed base of the stereoscopic range finder.

The conversion of such a single device into a device adapted to perform different measuring methods is particularly of advantage when employed for educational purposes, because with such an educational instrument it is possible to demonstrate and practice different measuring methods immediately one after the other.

When such an arrangement is converted from a coincidence measuring method to a stereoscopic measuring method it must be observed that during the stereo measurement the two optical path lengths in the device must be of the same length, while during the coincidence measuring method the lengths of the optical paths, owing to the insertion of reflecting bodies, are not the same. These reflecting bodies are so constructed that one of the partial light beams is independently directed, while the other is directed by means of at least two reflectors into the ocular. Accordingly, it is necessary to use a plurality of lens pairs, each of which forms an auxiliary telescope with an enlargement 1:1.

The adjustment of the concidence measuring arrangement takes place regardless whether the principle of the reverse image or split image or mixed image is used in a simple manner by means of a reflecting or refracting body (plane parallel plate or prism) by which the inclination of the partial light beam coming from the telescopic objective provided with the marker may be arbitrarily changed.

Figure 2:
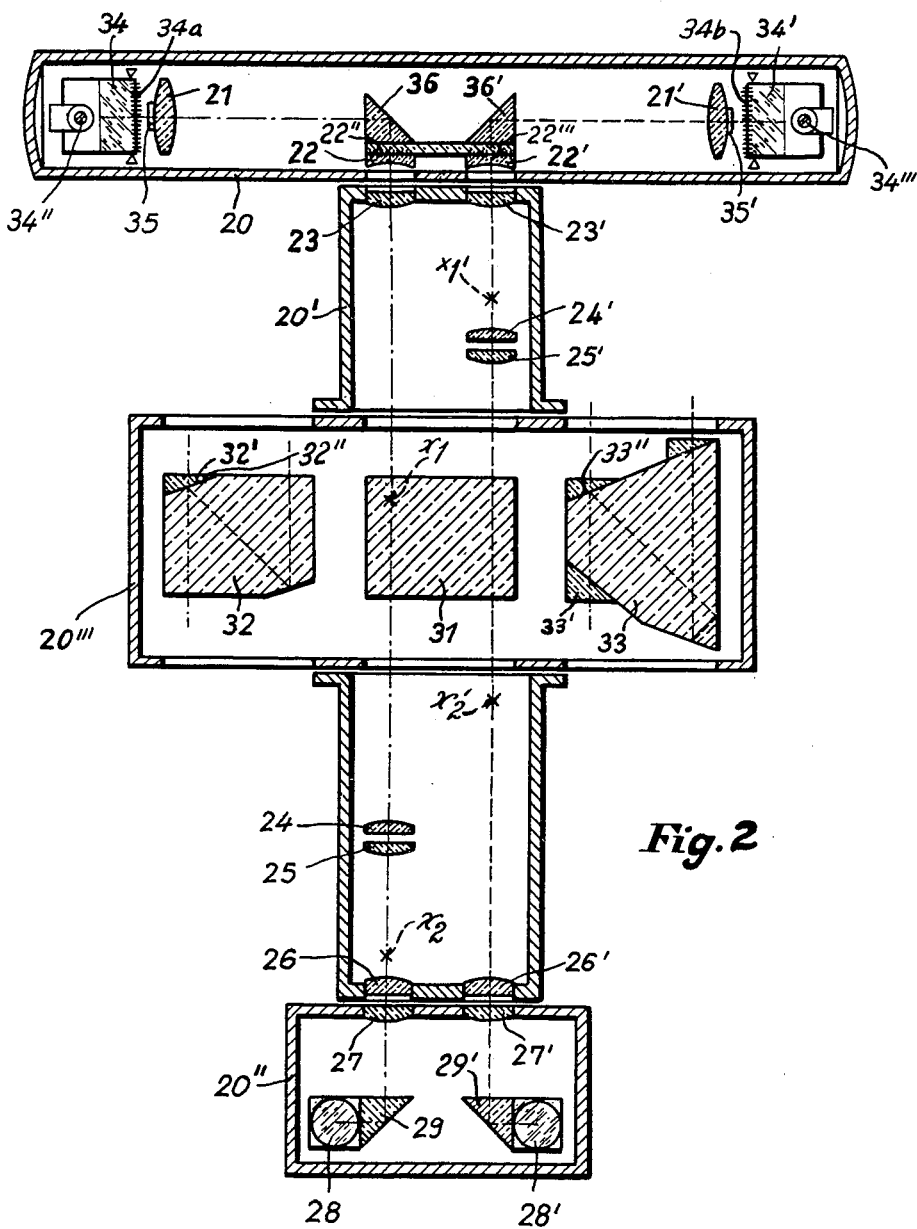

The invention will now be described in more detail with reference to the accompanying drawing, in which FIG. 1 illustrates diagrammatically a range finder having a non-symmetrical arrangement, and FIG. 2 illustrates diagrammatically a range finder which selectively may be used for different measuring methods, such as stereoscopic measurements, mixed image-, split image-, or reverse image measurements and, FIG. 3 is an elevational view of a modified form of the invention showing a rotary type carrier.

Referring to FIG. 1, the range finder is provided with a longitudinal housing 1 provided with a laterally extending observation tube 2. The housing 1 has mounted therein a double telescope provided with the objectives 11, 12 and 11', 12', 13' respectively, while the tube 2 has mounted therein the two oculars 3 and 3' one adjacent the other. The objective lenses 11 and 11' have mounted thereon the markers 4 and 4' respectively, the images of which are brought into coincidence in the ocular 3 when the device is used for coincidence measurements in the following manner:

The light beam entering the rectangular reflecting prism 5 at one outer end of the housing 1 passes through the objective lens 11 and then is reflected three times by a prism combination consisting of a rectangular prism 6 and a pentagonal prism 7. The light beam then passes through the objective lens 12 and a semi-transparent plane reflector 8 and finally is reflected by the rectangular roof edge prism 9 into the direction of the ocular 3 in which appears in addition to the sighted object also an image of the marker 4.

The light beam entering the deflecting prism 5' at the other end of the housing 1 passes through the objective lens 11' is reflected twice by the roof edge prism 10 and passes then through the objective lenses 12' and 13' to the plane mirror 14 which reflects the light rays onto the semi-transparent reflector 8. On account of this reflector 8 the light beam will receive the same direction as the other light beam passing therethrough and will be directed together with the same into the ocular 3. In the latter will appear next to the image of the marker 4 also an image of the marker 4' and the latter by a simple adjustment means may be brought to coincide with the image of the marker 4.

The adjusting means may, for instance, consist of a screw 15 or 15' acting upon one of the prisms 5 or 5', because such an adjusting screw will tilt the prism about the point of rotation. The projection of the markers 4 and 4' by means of the semi-transparent surfaces 5'', 5''', 6' and 10' of the prisms 5, 5', 6 and 10 respectively is well known. See for instance U.S. Patent No. 2,932,234, column 3, lines 20–25, 35–39 and 58–67. If now the semi-transparent mirror 8 and the mirror 14 are moved by a pivotal movement out of the path of the rays, then the light beams are no longer combined on the mirror 8 and the light beam coming from the prism 5' is directed by the deflecting prism 16 into the direction of the second ocular 3'. In such a case the device operates as a stereoscopic range finder.

FIG. 2 illustrates a symmetric construction of the range finder of the invention suitable for practicing different measuring methods, namely for the selective use as a stereoscopic range finder, mixed image range finder, split image range finder or reverse image range finder. The longitudinal housing 20 is provided in its central portion with a transversely extending tube 20' whose extreme end is provided with an ocular mount 20''. This housing structure contains the elements of the telescopes in an arrangement which remains always unchanged. The transverse tube 20' has, however, arranged between its ends a slidably adjustable mount 20''' extending parallel to the housing 20 and which contains three optical members 31, 32 and 33 which selectively may be shifted in axial alignment with the tube 20'.

The operation of the device illustrated in FIG. 2 is substantially as follows:

The adjustable mount 20''' has the shape of a slidable tubular carriage, but it would also be possible to substitute this slidable tubular carriage by an eccentrically rotatable mount 60 as illustrated in FIG. 3 which in similar manner as the slidable carriage has mounted therein three separate optical members 31, 32 and 33. It is assumed that a member, which has the form of a thick plane parallel plate, has been shifted into axial alignment with the tube 20' and that the two rectangular inlet prisms 34 and 34' in the outer ends of the housing 20 are so arranged that their bases are directed toward the viewer. The incoming light beams which are directed opposite to the direction of observation will be at right angles to the plane of the drawing and are reflected by one of the short sides of the prisms 34 and 34' toward the objective lenses 21 and 21' which have thereon the markers 35 and 35'. These objective lenses serve at the same time as collimators. The prisms 36 and 36' are arranged symmetrically with respect to the axis of the tube 20' in the central portion of the housing 20 and reflect the light rays parallel to the axis of the tube 20'. In rear of the two prisms 36 and 36' are arranged the two negative lenses 22 and 22' which together with the positive lenses 21 and 21' comprise each a so called Dutch telescope producing approximately a double enlargement. Within the left hand path of the ray is arranged a long focal length lens combination consisting of two similar positive lenses 23 and 24. These lenses are axially spaced from one another and the first lens 23 adjacent the housing 20 produces an intermediate image at $x_1$ within the slidable carriage 20'''. The mentioned lens combination 23, 24 constitutes a telescope producing an enlargement 1:1. This lens combination is followed by two similar but short focal length lenses 25 and 26, of which the first one produces at $x_2$ within the outer portion of the tube 20' and between the lenses 25 and 26 an intermediate image. Finally follows the combination of an additional positive lens 27 with the ocular 28 in which latter the deflecting prism 29 is inserted and which causes an erection of the image.

In the right hand path of the rays there is arranged in addition to the Dutch telescope 21', 22' a short focal length lens combination consisting of two similar positive lenses 23' and 24' of which the first lens produces an intermediate image at $x_1'$ between the lenses 23' and 24', namely within that portion of the tube 20' which is arranged between the housing 20 and the carriage 20'''. The focal length of the lenses 23' and 24' is the same as the focal length of the lenses 25 and 26 which are arranged in the left hand path of the rays. Then follows a combination of two long focal length positive lenses 25', 26' which are of the same focal length as the lenses 23 and 24 in the left hand path of the light rays and of which the first lens 25' produces an intermediate image at $x_2'$, namely in that portion of the tube 20' which is arranged between the carriage 20''' and the ocular mount 20''. Then follows again an image erecting combination 27', 28' which includes a deflecting prism 29'. The exchange of the long and short focal length combinations in the two paths of the rays remains without influence upon the projection and is solely provided with consideration of the selective employment in the device of the different members 31, 32 and 33.

The described device may be converted into a coincidence measuring device when the plane parallel plate 31 is replaced by one of the prisms 32 or 33. In such a case of conversion, there is, of course, only one of the two oculars used, namely in the illustrated embodiment the left ocular 28.

When the plane parallel plate 31 is replaced by the pentagonal prism 32 on the upper inclined face 32'' of which a supplemental prism 32' is secured, in order to present to the left hand beam of the light rays a vertical surface of incidence, then no change takes place within the left hand path of the light rays. This left hand beam of light passes through the prism without being reflected.

The optical length of the path is the same within the prism 32 as in the exchanged plate 31.

The right hand beam of light, however, is subjected to a double reflection in view of which the intermediate image which previously was located at $x_2'$ will now be combined with the intermediate image at $x_1$. The reflecting surface covered by the supplemental prism 32' causes, therefore, a combination of the right hand beam of light with the left hand beam. The semi-transparent portion of this surface at this place produces an edge which is arranged transversely to the beam of light and, therefore, is sharply projected together with the sighted object and with the projected marker at $x_2$. This intermediate image will be observed in the ocular 28.

The markers 35 and 35' on the lenses 21 and 21' respectively, serve as adjusting markers which belong to the device itself. The images of the same which are observed in the ocular can be brought to coincidence by very simple adjusting means. These markers 35 and 35' may also be constructed as luminous markers when special illuminating prisms are employed for the same. The images of such luminous markers will be reflected by the partly transmitting exit surfaces 34a and 34b of the prisms 34 and 34' and the similarly treated entrance surfaces 22" and 22''' of the plano-concave lenses 22 and 22' respectively. In this case the coincidence position may be obtained by tilting one of the entrance prisms 34 or 34' about its axis of rotation by a screw 34" or 34'''. As soon as this coincidence position of the image of the marker has been obtained, the range finder has been correctly adjusted. The device operates, therefore, as a split image range finder when the reflecting ray uniting surface on the prism 32 is, as already mentioned, semi-transparent, and the device operates as a mixed image range finder when the mentioned ray combination surface is semi-transparent over its entire area.

When the carriage 28''' is shifted to a position in which the irregular pentagonal or trapezoidal prism 33 is moved into axial alignment with the tube 20', then the conditions of the combination of the rays are very similar. In view of the triple reflection within the prism 33 the image of the target and of the marker 35' produced by the right hand beam of light will be reversed relative to the image of the target and the marker 35 produced by the left hand beam of light. The device, therefore, operates as a reverse image range finder. The reflecting ray combination surface of the prism 33 is made completely reflective over one half of its area. The edge formed on the prism will be portrayed sharply within the viewing area of the ocular because it is positioned transversely to the direction of the beam. For the purpose of creating beam inlet and beam outlet surfaces which are vertical, the prism 33 is provided with supplemental prisms 33' and 33".

It should be noted that the construction of the device of the invention is not limited to the disclosed embodiments. It is, for instance, possible to replace the rectangular deflecting prisms 36 and 36' by pentagonal prisms and the ray combining prisms 32 and 33 may be replaced by other prisms causing even numbered or odd numbered reflections, or one may even employ mirror combinations which follow the principle that the optical length of the path for the non-reflected beam of light which passes straight through is equal to the optical length of the path when the device is being used as a stereoscopic range finder.

What I claim is:

1. A range finder comprising a longitudinal housing, two telescope objectives mounted symmetrically to an imaginary axis and a fixed distance apart in the end portions of said housing, an adjustably mounted reflecting prism arranged in front of each objective lens for reflecting the beams of light entering said housing into said objective lenses, said prisms each having a semi-reflecting surface on the face adjacent its respective objective, a tube extending transversely of said housing between the ends thereof, a pair of oculars in the end of said tube arranged in spaced apart relation for binocular use, a marker on each objective lens, two fixed reflecting prisms arranged between said objective lenses to deflect the rays from the objectives into the transverse tube in the form of two light beams having parallel axes, each light beam directed to a respective ocular, a semi-transparent reflector adjacent one side surface of each of said fixed reflecting prisms, each semi-transparent reflector cooperating with its respective objective and marker to form a collimated marker image which is reflected by the semi-transparent surface of the respective adjustably mounted reflecting prisms, a reflecting system arranged in the rear of said fixed reflecting prisms including an inclined full reflector element in one of said light beams and an inclined semi-transparent reflector element in the other of said light beams, said elements being mounted for movement into and out of their respective light beams to enable the range finder to be used optionally as a binocular stereoscopic type or a monocular coincidence type, said inclined full reflector element, when in operative position, reflecting one of said light beams to the inclined semi-reflector element in operative position in the other light beam, whereby both of said light beams are combined and directed toward one of said oculars, and means for adjusting at least one of said adjustably mounted reflecting prisms for bringing the images of said markers appearing in one of said oculars into registration, when the reflecting system is in operative position for monocular coincidence type use.

2. A range finder as claimed in claim 1, and including two auxiliary telescopes arranged in cross-symmetrical fashion in each one of the two light beams in the transverse tube, said auxiliary telescopes comprising each one long focal length and one short focal length objective system producing an enlargement of 1:1 and arranged so that the intermediate image plane in each light beam is positioned at the surface of the inclined semi-reflector element when in operative position.

3. A range finder as claimed in claim 1, wherein the inclined full and semi-transparent reflector elements of the reflector system are formed as surfaces of an irregular pentagonal prism, a movable mount carrying said prism and a plane parallel path length compensating glass plate carried by the movable mount in spaced relation to said prism, the prism and glass plate being alternately inserted in the two light beams by movement of the mount.

4. A range finder as claimed in claim 1, wherein the inclined full and semi-transparent reflector elements of the reflector system are formed as surfaces of an irregular pentagonal prism, said prism having an entrance face aligned with the full reflector surface and at a right angle to its respective light beam, and a supplemental wedge prism attached to the semi-reflecting surface of the prism to provide a second entrance face at a right angle to the second light beam.

References Cited by the Examiner

UNITED STATES PATENTS

| | | | |
|---|---|---|---|
| 1,843,439 | 2/32 | Bauersfeld et al. | 88—29 |
| 2,106,632 | 1/38 | Freund | 88—2.7 |
| 2,407,187 | 9/46 | Strang et al. | 88—2.7 |
| 2,554,798 | 5/51 | Schwarz et al. | 88—2.7 |

DAVID H. RUBIN, *Primary Examiner.*

EMIL G. ANDERSON, *Examiner.*